United States Patent [19]

Aman

[11] Patent Number: 4,728,927
[45] Date of Patent: Mar. 1, 1988

[54] APPARATUS AND METHOD FOR PERFORMING COMPARISON OF TWO SIGNALS

[76] Inventor: James A. Aman, Box 336, Cathcart Rd., Gwynedd Valley, Pa. 19437

[21] Appl. No.: 656,054

[22] Filed: Sep. 28, 1984

[51] Int. Cl.$^4$ ............................................... G06F 7/04
[52] U.S. Cl. ................................................ 340/146.2
[58] Field of Search ................................ 340/146.2; 364/900 MS File

[56] References Cited

U.S. PATENT DOCUMENTS

| | | | |
|---|---|---|---|
| 2,885,655 | 5/1959 | Smoliar | 340/146.2 |
| 3,363,233 | 1/1968 | Petzold | 340/146.2 |
| 3,390,378 | 6/1968 | Anderson et al. | 340/146.2 |
| 4,225,849 | 9/1980 | Lai | 340/146.2 |

OTHER PUBLICATIONS

Mano, M. Morris, "Computer System Architecture", 1976, pp. 323–325.
Barna et al., "Integrated Circuits in Digital Electronics", 1973, pp. 228–229.

Primary Examiner—Gary V. Harkcom
Assistant Examiner—Tan V. Mai
Attorney, Agent, or Firm—Caesar, Rivise, Bernstein, Cohen & Pokotilow, Ltd.

[57] ABSTRACT

A comparator and a method for comparing one digital signal composed of n bits to a second digital signal also composed of n bits. The comparator includes a predetermined number of logic levels. The comparator samples and compares selected bits of the two signals in any order and applies Boolean algebra operations to the signals without reference to any comparison of any other bits of the signals. The comparator provides an output signal of one logic level if one signal is greater than the other, and of a second logic level if the one signal is less than or equal to the other signal.

10 Claims, 1 Drawing Figure

APPARATUS AND METHOD FOR PERFORMING COMPARISON OF TWO SIGNALS

CROSS REFERENCE TO RELATED APPLICATION

The comparator and method of comparison of this invention can be used in the apparatus and method for performing the mathematical operations of addition and subtraction, such as disclosed and claimed in my co-pending U.S. Application Ser. No. 06/640,736 filed on Aug. 14, 1984 entitled Apparatus and Method for Performing Mathematical Functions.

BACKGROUND OF THE INVENTION

This invention relates generally to computers and computing equipment and more particularly to comparators for performing high speed comparison operations.

Traditional devices and methods for comparing two signals, e.g., multi-bit binary signals, A and B, to see if $A > B$ or $A \leq B$ have relied on some type of adder circuit to determine the difference of B-A. Such an operation would set the carryout signal of the most significant bit to a logical "one" if A was greater than B or a logical "zero" if A was less than or equal to B. The determination of the carryout signal has been deemed essential to ensure that each of the individual bit comparisons provides an accurate and singular output. As will be appreciated by those skilled in the art the operation of determining the carry bit(s) is an inherently serial process in that the carry from the ith bit to the (i+1)th bit is in itself a function of the carry from the (i−1)th bit to the ith bit. This serial characteristic results in time delays, referred to as "carry bit propogation" through the circuitry making up the comparator device.

Inasmuch as one of the basic circuits of a computer or any piece of computing equipment is a comparator, the digital comparison process in state-of-the-art computing is experiencing a high degree of interest for devices and techniques to minimize or obviate the delays inherent in carry bit propogation. To that end techniques have been disclosed to determine the content of each carry bit prior to the operation producing it. Such techniques are frequently referred to as "look-ahead" techniques. However such devices and techniques have not been without some drawbacks, e.g., circuit complexity.

Accordingly, it is a general object of the instant invention to provide a comparator and a method of comparison which overcomes the disadvantages of the prior art.

It is a further object of this invention to provide a comparator and a method for comparing the bits of two, n-bit digital signals without reference to the results of any other bit pair comparisons of those signals.

It is still a further object of this invention to provide a comparator and a method for comparing two, n-bit digital signals in a minimum number of logic levels, independent of n.

It is still a further object of this invention to provide a comparator and a method of comparing two, n-bit digital signals, A and B to determine if $A > B$ or conversly if $A \leq B$.

It is still a further object of this invention to provide a comparator and a method of comparing two, n-bit digital signals A and B so that when a conventional comparator for determining of $A = B$ is used therewith, one can determine the following relationships, $A = B$, $A \neq B$, $A < B$, $A \leq B$, $A > B$ and $A \geq B$.

SUMMARY OF THE INVENTION

These and other objects of the instant invention are achieved by providing a comparator and a method for comparing one digital signal A, composed of n bits, to another digital signal B, composed of n bits. The comparator comprises means for sampling selected bits of the signals in any order and applies Boolean algebra thereto without the necessity of referring to any other bit comparison to provide an output signal of one logic level if A is greater than B and of a second logic level if A is less than or equal to B.

BRIEF DESCRIPTION OF THE DRAWING

Other objects and many of the attendant advantages of this invention will be readily appreciated as the same becomes better understood by reference to the following detailed description when considered in connection with the accompanying drawing wherein.

DESCRIPTION OF THE PREFERRED EMBODIMENT

Figure 1:
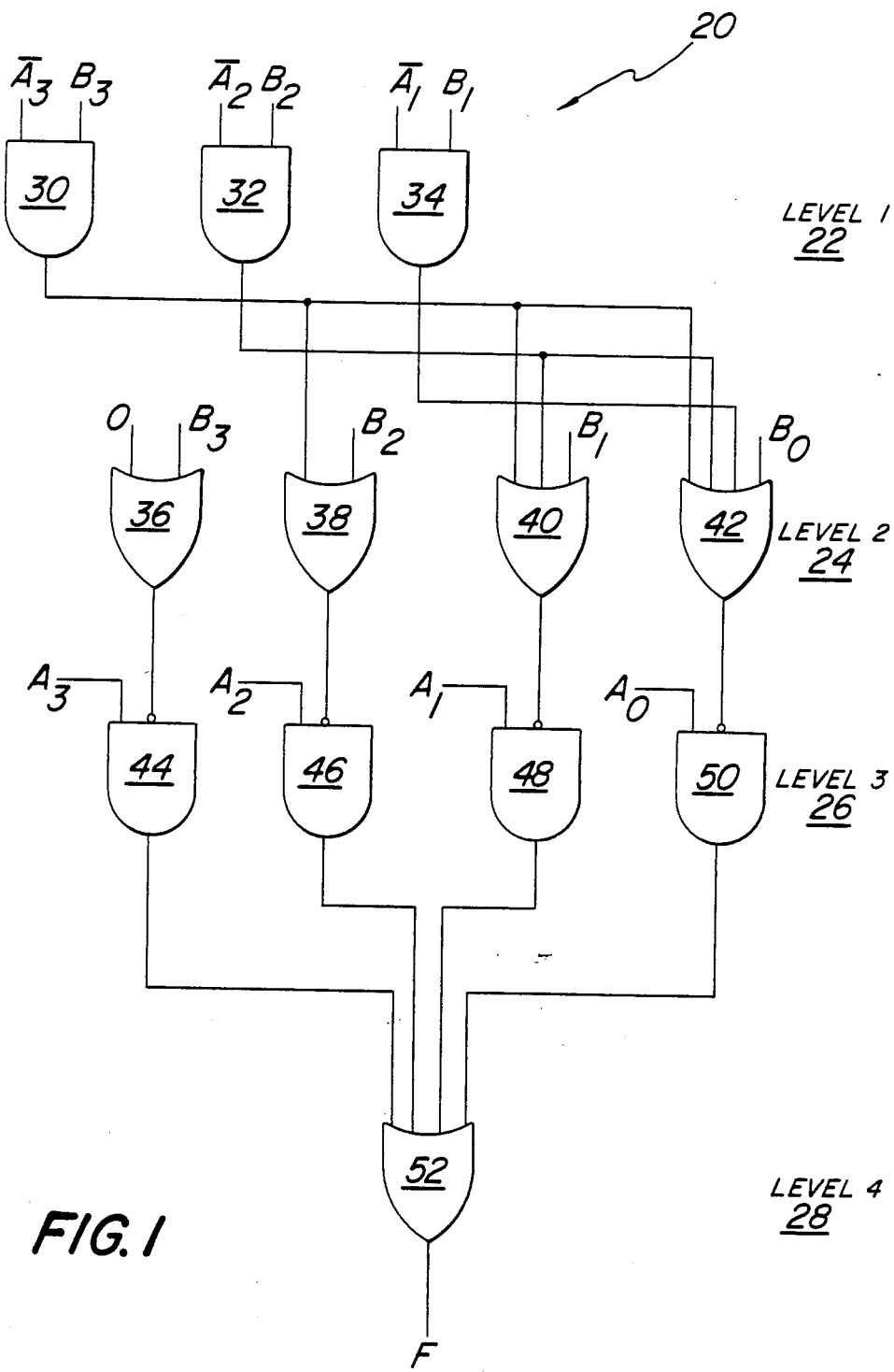
FIG. 1 is a schematic diagram of a comparator circuit constructed in accordance with the subject invention and arranged for comparing two, four-bit binary signals.

Referring to the FIGURE of the drawing wherein like reference characters refer to like parts, there is shown at 20 in FIG. 1 a comparator circuit constructed in accordance with the subject invention. As will be described in detail later that comparator circuit basically comprises four logic levels, namely level one, identified by reference numeral 22, level two, identified by reference numeral 24, level three, identified by reference numeral 26 and level four, identified by reference numeral 28.

It must be pointed out at this juncture that the components making up the levels shown in FIG. 1 are merely exemplary and other means can be used to effect the same Boolean algebra operations as will be described hereinafter. Moreover, by use of the appropriate member of gates, multi-bit signals of any length can be compared independent of the number of bits making up those signals.

The circuit 20 utilizes a basic technique or process which is accomplished in the four logic levels to provide information as to whether an A signal, composed of plural (n) bits, is greater than a B signal composed of the same number of bits, or whether the A signal is less than or equal to the B signal. The technique or method performed by the circuit 20 and which is the subject of the invention entails the examination of all bit pairs $A_i B_i$, where i represents any particular bit from 0 to n (n being the highest order or most significant bit). That examination finds the highest order $A_i B_i$ pair in which $A_i$ is greater than $B_i$, i.e., $A_i = 1$ and $B_i = 0$. All bit pairs $A_j$ and $B_j$ which are more significant, i.e., j is greater than i, are then examined to see if any $A_j = 0$ and $B_j = 1$. If none exists then the A signal is greater than the B signal. Else, the A signal is less than or equal to the B signal.

The foregoing technique is basically accomplished by the circuit 20 in the three logic levels referred to previously as level 1, level 2 and level 3. The fourth logic level is included in circuit 20 to provide the information of whether A is greater than B or less than or equal to B with a single output bit.

Before describing the construction and specific operation of the exemplary components forming the logic levels shown in FIG. 1, a brief description of the operation of each level will now be given. To that end, level 1 is arranged to determine if $B_i$ is greater than $A_i$. In particular level 1 examines all the bit combinations $A_i$ $B_i$ to see if B is greater than A, and produces a logic high or "1" output only in the case of $B_i$ being greater than $A_i$ (which can only happen if $B_i=1$ and $A_i=0$). It will be noted by those skilled in the art that if $B_i$ is greater than $A_i$ this factor will negate the effect of the B signal being less than the A signal for all bit combinations being less significant than i.

Level 2 operates in response to level 1 and is arranged to determine if $B_i=1$ or if some $B_j$ bit is greater than its corresponding $A_j$ bit (where j is any bit more significant than i). As will be appreciated by those skilled in the art, if $B_i=1$ or for some j more significant than i, $B_j=1$ and $A_j=0$ then the $A_i$ signal could not possibly cause the A signal to be greater than the B signal (at most it could be equal to it). Thus, the output of level 2 indicates the potential of $A_i$ to cause the A signal to be greater than the B signal.

Level 3 operates in response to level 2 and is arranged to determine if the output of level 2 is a 0 indicating that either $B_i$ is a 0 or that no $B_j$ bit is greater than its corresponding $A_j$ bit and if $A_i=1$, to reveal whether the A signal is greater than the B signal, or the A signal is less than or equal to the B signal. In this regard if the output of level 2 for each bit pair compared is a "1" that means that either $B_i$ is a "1" (hence indicating that at most A would be less than or equal to B) or that for the more significant bit pairs greater than i, some B bit is greater than its corresponding A bit. If, the output of level 2 is instead a "0", that means that $B_i$ is a "0" and that no bit pair more significant than i has its B bit greater than the A bit (which can only occur if $B_j1$ and $A_j0$). Thus, level 3 examines the outputs of level 2 and also determines if $A_i=1$. If the output of level 2 is a "0" and $A_i=1$ then A is greater than B, else A is less than or equal to B.

Level 4 is arranged to take the output of level 3, which output indicates the results of the AB comparison, and provides that information in the form of a single output bit.

The details of each of these logic levels 22, 24, 26 and 28 will now be discussed.

As mentioned earlier the first logic level 22 is arranged to examine the bit pairs $A_i$ $B_i$ to determine if $B_i$ is greater than $A_i$. That action is accomplished in this level by plural gates 30, 32 and 34. Each gate is a two-input AND gate arranged to examine a different order bit of the A and B signals. As will be appreciated by those skilled in the art for binary numbers $B_i$ can only be greater than $A_i$ if B=1 and A=0. Thus, the AND gates 30, 32 and 34 are arranged to have their A bit input the 1's compliment (inverse) cf the $A_i$ bit, i.e., $\overline{A}_i$. The other input of each AND gate is the $B_i$ bit. Hence, as can be seen the inputs to AND gate 30 are $\overline{A}_3 B_3$, the inputs to AND gate 32 are $\overline{A}_2 B_2$ and the inputs to AND gate 34 are $\overline{A}_1 B_1$. As mentioned earlier, the examination of any bit pair $\overline{A}_i B_i$ to determine if $B_i$ is greater than $A_i$ is used in the negate the effect of B being less than A for all bit combinations less significant than i. Since there are no bits less significant than the lowest order bit i=0, no comparison of $\overline{A}_0 B_0$ is utilized and hence the first level 22 does not include any gate to provide that comparison. The first level 22 provides three output bits, one bit from gate 30 representing the $\overline{A}_3 B_3$ comparison, one bit from AND gate 32 representing the $\overline{A}_2 B_2$ comparison and one bit from AND gate 34 representing the $\overline{A}_1 B_1$ comparison.

The second logic level 24, as described earlier, is arranged to examine each of the B bits to determine if it is a "1" and if any of the B bits which are more significant then the B bit being examined are greater than their corresponding A bit. Thus, the second level 24 includes plural OR gates 36, 38, 40, and 42. OR gate 42 is arranged to examine the $B_0$ (least significant or lowest order) bit as well as the outputs from each of the level one gates 30, 32, and 34, namely, $\overline{A}_1 B_1$, $\overline{A}_2 B_2$, and $\overline{A}_3 B_3$, to determine if $B_0=1$ or if either $B_1$, $B_2$ or $B_3$ is greater than $A_1$, $A_2$ or $A_3$, respectively. Thus, OR gate 42 comprises a four-input OR gate, three of whose inputs are connected to the outputs of the level one gates 30, 32 and 34 and whose fourth input is provided with the $B_0$ bit.

The level two OR gate 40 is arranged to examine the $B_1$ (next more significant) bit as well as the $\overline{A}_2 B_2$ and $\overline{A}_3 B_3$ bits to determine if $B_1=1$ or if either $B_2$ or $B_3$ is greater than $A_2$ or $A_3$, respectively. Thus, the OR gate 40 comprises a three-input OR gate, two of whose inputs are connected to the first level AND gates 30 and 32 and whose third input is provided with the $B_1$ bit. The second level OR gate 38 examines the $B_2$ (the next more significant) bit as well as the $\overline{A}_3 B_3$ bit to determine if $B_2=1$ or if $B_3$ is greater than $A_3$. Thus, the OR gate 38 comprises a two-input OR gate, one of whose inputs is connected to the output of the first level AND gate 30 and whose other input is provided with the $B_2$ bit. The second level OR gate 36 is arranged to examine the $B_3$ (most significant) bit. Since there are no more significant bits than $B_3$ the other input to the OR gate 36 receiving the $B_3$ bit is always a "0". Thus, if desired the OR gate 36 may be omitted and the $B_3$ bit provided directly as in input to AND gate 44.

As described earlier the third logic level 26 serves to examine the outputs of the second logic level 24 and the $A_i$ bits to determine if the outputs of the second logic level for each comparison are a "0" and if $A_i=1$. Thus, logic level three comprises plural AND gates 44, 46, 48 and 50. Each AND gate is a two-input AND gate, having one input provided with the $A_i$ bit. In particular AND gates 50, 48, 46, and 44 are provided with bits $A_0$, $A_1$, $A_2$, and $A_3$, respectively. The other input of each of the level three AND gates is provided from the output of the level two OR gates. To that end the output of OR gate 42 is connected as the second input to AND gate 50. As can be seen that input is an inverted input such that the output bit of OR gate 42 is inverted before being input to AND gate 50. In a similar manner the output of the second level OR gates 40, 38, and 36 are provided to inverted inputs of the third level AND gates 48, 46, and 44, respectively.

As will be appreciated by those skilled in the art if the output of any of the second level OR gates is a logic low (0), thus indicating the potential for A to be greater than B (based on the condition of $A_i$), then that logic low output being inverted at the input of the associated level three AND gate, enables that AND gate. Conversely, a logic high or "1" output of any level two OR gate disables the associated level three AND gate. Thus, if any level three AND gate is enabled and its $A_i$ *input is a* "1", a logic high signal appears at its output. This signal indicates that the A signal is, in fact, greater than the B signal.

In order to provide the results of the AB comparison as effected by levels 1-3 in a single output bit F, level 4 is composed of a single, four-input OR gate 52. Each input of the OR gate 52 is connected to the output of a respective level three AND gate. Thus, if any level three AND gate produces a logic high (1) output, thus indicating that A is greater than B, the OR gate 52 provides a logic high output bit to indicate that fact with a single bit. Conversely, if none of the level three AND gates provides a logic high signal, the output of the level four AND gate 52 is "0", thereby indicating that A is less than or equal to B.

Operation of the circuit 20 will now be described for the exemplary comparison of two signals A and B, where A is less than B. Thus, assuming that signal A consists of the four-bit signal string 0110 (decimal 5) and the B string signal consists of 1001 (decimal 9), the $B_1$, $B_2$ and $B_3$ inputs to gates 34, 32 and 30, respectively, consists of the bits 0, 0, 1 while the $\overline{A_1}$ $\overline{A_2}$ and $\overline{A_3}$ inputs to those gates are the bits 0, 0, 1, respectively. Accordingly, only AND gate 30 provides a high (1) output signal. This high signal is passed to OR gates 42, 40, and 38, thereby resulting in a high signal (1) appearing at each of their outputs. The level two OR gate 36 is provided with the $B_3$ bit "1", whereupon its output is also a "1". Accordingly, the output of each of the level two OR gates is a "1". This action has the effect of disabling all of the level three AND gates 26. Accordingly, the output of each of the level three AND gates is a "0" and hence the resultant output bit F provided by OR gate 52 is also a "0", thereby indicating that A is less than or equal to B (which in fact it is since 5 is less than 9).

As a second example the two, four bit strings A and B being compared are the same, e.g., are each 1011 (decimal 11). Thus, the $B_1$ $B_2$ and $B_3$ inputs to gates 34, 32 and 30, respectively, of level one are 1, 0, 1. The $\overline{A_1}$ $\overline{A_2}$ and $\overline{A_3}$ inputs to gates 34, 32 and 30, respectively, are thus 0, 1, and 0, respectively. Accordingly, the output of each of the level one AND gates is a "0". Those low signals are provided to OR gates 42, 40 and 38. Since $B_0$ $B_1$ and $B_3$ are each a "1" the outputs of OR gates 42, 38, and 36, respectively are each a "1". Since $B_2$ is 0 the output of OR gate 38 is a "0". The "1"s output from OR gates 36, 40, and 42 have the effect of disabling the level three AND gates 44, 48, and 50, respectively. This action causes each of those level three gates to provide a low (0) output signal. The low signal appearing at the output of the level two OR gate 38 enables the associated level three AND gate 46. One input to AND gate 46 is provided by the $A_2$ bit which is a "0". Accordingly the output of AND gate 46 is also a "0". In view of the fact that the output of each of the level three AND gates 44–50 is a "0" the output of the level four OR gate 52 is a "0", that is the F bit is a 0 indicating that the A string is less than or equal to the B string (A is in fact equal to B).

As a third example operation of circuit 20 will be described for a situation where A>B. Thus, in this example circuit 20 compares the A string 1011 (decimal 11) to the B string of 1001 (decimal 9 ). In such a case the $B_1$, $B_2$ and $B_3$ bits provided to level one AND gates 34, 32 and 30, respectively are 0, 0, and 1. The $\overline{A_1}$, $\overline{A_2}$ and $\overline{A_3}$ inputs to AND gates 34, 32, and 30, are 0, 1, and 0. Accordingly, the output of each of the level one AND gates is a "0". Those signals are provided to level three OR gates 42, 40, and 38. The $B_0$ and $B_3$ inputs to OR gates 42, and 36, respectively are each "1", whereupon the outputs of those gates is also a "1". This action has the effect of disabling the level three AND gates 50 and 44 so that they each provide a "0" at their respective output. The $B_1$ and $B_2$ bits are each "0" and are provided as inputs to level two OR gates 40 and 38, respectively. Since the other inputs to those two OR gates are also "0" (as provided by the level one AND gates) the output of OR gate 40 enables level three AND gate 48 while the output of OR gate 38 enables the level three AND gate 46. Since the $A_1$ bit is "1", the output of AND gate 48 is "1". The $A_2$ bit is "0" so that the output of AND gate 46 is "0". The "1" appearing at the output of level three AND gate 48 is passed to the level four OR gate 52, whereupon the resulting output bit F is a 1. This action indicates that A is greater than B (in fact 11 is greater than 9).

As will be appreciated by those skilled in the art the comparison means and method of the subject invention determines whether one signal is greater than another or else is less than or equal to the other. Thus, in order to provide all of the six potential logical comparisons the subject invention is utilized with a conventional identity comparator, that is a circuit for determining if two signals are equal. In such an application one can readily determine the six equality/inequality relationships, namely, $A=B$, $A \neq B$, $A<B$, $A \leq B$, $A>B$, and $A \geq B$.

As will be appreciated from the foregoing the and method of this invention enables the comparison of the two strings of n-bits to be effected in any order and without the necessity of relying on the results of any other bit comparison so that the comparisons can be accomplished simultaneously. This action thus offers great promise for effecting high speed comparisons. Moreover, implementation of the circuitry can be readily effected inasmuch as the circuitry doesn't require any AND gates having more than two inputs.

Further still by utilizing the comparison means 20 and method of this invention one can effect high speed operations other than comparisons, such as the mathematical operations of addition, subtraction, etc. In this regard in my copending U.S. Pat. application Ser. No. 06/640,736, filed on 8/14/84, and entitled Apparatus and Method For Performing Mathematical Functions there is shown and claimed devices and methods for effecting high speed mathematical operations which are not dependent on number of bits or digits in the signals being operated upon. The means and method disclosed therein effectively makes use of the comparison means constituting this invention.

Without further elaboration the foregoing will so fully illustrate my invention that others may, by applying current or future knowledge, readily adapt the same for use under various conditions of service.

I claim:

1. A comparator for comparing one digital signal A, composed of n bits, each bit being either a high or a low value and where $A_i$ represents any particular bit whose order is defined by a value from $i=0$ to $i=n-1$, to another signal B, composed of n bits, each bit being either a high or a low value and where $B_i$ represents any particular bit whose order is defined by a value from $i=0$ to $i=n-1$, the $A_i$ bit for one value of i and $B_i$ bit for the same value of i defining a bit pair $A_iB_i$, said comparator comprising means for examining each bit pair $A_iB_i$ for each of the values i, with the examination of each of said pairs being in any sequence of values of i, said means for examining comprising:

(a) first means comparing bit $A_i$ to bit $B_i$ for each of said bit pairs $A_iB_i$ except for the lowest order bit to provide respective first output signals for each bit pair compared, each of said first output signals being of a first predetermined logic level if and only if the value of $B_i$ is greater than the value of $A_i$;

(b) second means responsive to said first means for examining all but the highest order bit of said B signal and selected bits of said first output signals, said selected bits of said B signal being provided directly to said second means, said second means for providing respective second output signals for each of said B bits examined, with each of said second outputs signals being at a second predetermined logic level for every case in which either the B bit examined is equal to said high value or if in any bit pair more significant than i there exist at least one case where the bit of signal B is of a greater value than the same order bit of signal A; and (c) third means responsive to said second means for examining selected bits of said A signal and selected bits of said second output signals, said selected bits of said A signal being provided directly to said third means, said third means for providing respective third outputs signals for each of said A bits examined, with each of said output signals being at a third predetermined logic level if and only if bit $A_i$ is equal to said high value and the second output signal for the bit is not at said second predetermined logic level, whereupon if any of said third output signals is at said third predetermined logic level said comparator indicates that said A signal is greater than said B signal, if not, said comparator indicates that said A signal is less than or equal to said B signal.

2. The comparator of claim 1, wherein said examining means additionally comprises:

(d) fourth means responsive to said third output signals for providing a fourth output signal of a fourth predetermined logic level if any of said third output signals is at said third predetermined logic level, thereby indicating that A is greater than B, if not, said comparator indicates that A is less than or equal to B.

3. The comparator of claim 1, wherein all of said bits of said A signal are examined by said third means and wherein said third means also examines the highest order bit of said B signal.

4. The comparator of claim 1, wherein said first means comprises AND gate means, said second means comprises OR gate means, and said third means comprises AND gate means.

5. The comparator of claim 4, wherein said AND gate means comprise plural AND gates.

6. The comparator of claim 5, wherein said AND gates are each dual input AND gates.

7. The comparator of claim 1, wherein said first means comprises AND gate means, said second means comprises OR gate means, said third means comprises AND gate means, and said fourth means comprises OR gate means.

8. A method for comparing one digital signal A, composed of n bits, each bit being either a high or a low value and where $A_i$ represents any particular bit whose order is defined by a value from $i=0$ to $i=n-1$, to another digital signal B, composed of n bits, each bit being either a high or a low value and where $B_i$ represents any particular bit whose order is defined by a value of from $i=0$ to $i=n-1$, the $A_i$ bit for one value of i and the $B_i$ bit for the same value of i defining a bit pair $A_iB_i$, said method comprising the steps of:

(a) examining selected same order bits of said A and B signals, said selected same order bits being the bit pair $A_iB_i$, where $A_i$ is the ith order bit of signal A and $B_i$ is the same order bit of signal B, said examination being of each bit pair except for the lowest order bit;

(b) comparing bit $A_i$ to bit $B_i$ for said selected bit pairs to provide respective first output signals for each bit pair examined, each of said first output signals being of a first predetermined logic level if and only if the value of $B_i$ is greater than the value of $A_i$;

(c) directly providing selected bits of said B signal and said first output signals to means for examining all but the highest order bit of said B signal and selected bits of said first output signals for producing respective second output signals for each of said B bits, with each of second output signals being at a second predetermined logic level for every case in which either the B bit examined is equal to said high value or if in any bit pair more significant than i there exists at least one case where the bit of signal B is of a greater value than the same order bit of signal A;

(d) directly providing selected bits of said A signal and said second output signals to means for providing respective third output signals for each of said A bits examined, with each of said third output signals being at a third predetermined logic level if and only if the bit $A_i$ is equal to said high value and the second output signal for that bit is not at said second predetermined logic level, whereupon if any of said third said output signals is at said first predetermined logic level said A signal is greater than said B signal, if not, said A signal is less than or equal to said B signal.

9. The method of claim 9 additionally comprising the step of:

(e) providing a fourth output signal of a fourth predetermined logic level if any of said third output signals is at said third predetermined logic level, thereby indicating that A is greater than B, if not, said comparator indicates that A is less than or equal to B.

10. The method of claim 9, wherein said selected bits of said A signal examined comprise all of said bits and wherein the highest order bit of said B signal is also examined.

* * * * *